US012763634B2

(12) United States Patent
Fujikawa

(10) Patent No.: US 12,763,634 B2

(45) Date of Patent: Oct. 13, 2026

(54) MOTOR CASE WITH CORRUGATED OIL PASSAGE

(71) Applicant: TOYOTA JIDOSHA KABUSHIKI KAISHA, Toyota (JP)

(72) Inventor: Masato Fujikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 18/824,529

(22) Filed: Sep. 4, 2024

(65) Prior Publication Data

US 2025/0132632 A1 Apr. 24, 2025

(30) Foreign Application Priority Data

Oct. 19, 2023 (JP) ................................ 2023-180637

(51) Int. Cl.
*H02K 9/19* (2006.01)
*H02K 5/20* (2006.01)

(52) U.S. Cl.
CPC .................................. *H02K 5/203* (2021.01)

(58) Field of Classification Search
CPC H02K 5/203; H02K 5/20; H02K 5/18; H02K 9/19; H02K 9/193; H02K 9/197
USPC .............................................. 310/89, 52, 58
See application file for complete search history.

(56) References Cited

U.S. PATENT DOCUMENTS

| | | | | |
|---|---|---|---|---|
| 4,818,906 | A * | 4/1989 | Kitamura | H02K 9/197 310/58 |
| 2012/0318479 | A1* | 12/2012 | Chang | H02K 5/15 165/104.19 |
| 2013/0076168 | A1* | 3/2013 | Memminger | H02K 9/12 310/54 |
| 2019/0173351 | A1* | 6/2019 | Seol | H02K 5/18 |
| 2022/0131427 | A1* | 4/2022 | Deac | H02K 1/185 |

FOREIGN PATENT DOCUMENTS

| | | | |
|---|---|---|---|
| JP | 2008109817 | A * | 5/2008 |
| JP | 2012-122451 | A | 6/2012 |

OTHER PUBLICATIONS

Machine translation of JP-2008109817-A. (Year: 2008).*

* cited by examiner

*Primary Examiner* — Michael Andrews
(74) *Attorney, Agent, or Firm* — Dinsmore & Shohl LLP

(57) ABSTRACT

A motor case includes: a case inner wall, and an oil passage provided on the case inner wall to flow a lubricating oil therein. Further, the case inner wall includes a plurality of wedge-shaped portions, arranged side by side in a circumferential direction of a stator, for supporting an outer periphery of the stator, and a corrugated portion disposed radially outward of the stator with respect to the plurality of wedge-shaped portions and disposed around the plurality of wedge-shaped portions, and the oil passage is provided between the plurality of wedge-shaped portions and the corrugated portion, so that a lubricating oil is meandering so as to flow in the radial direction and in the circumferential direction of the stator.

9 Claims, 2 Drawing Sheets

MOTOR CASE WITH CORRUGATED OIL PASSAGE

CROSS-REFERENCE TO RELATED APPLICATION(S)

The present application claims priority to and incorporates by reference the entire contents of Japanese Patent Application No. 2023-180637 filed in Japan on Oct. 19, 2023.

BACKGROUND

The present disclosure relates to motor cases.

Japanese Laid-open Patent Publication No. 2012-122451 discloses a structure in which a gap portion is formed between the inner peripheral surface of the motor case and the outer peripheral surface of the stator core, so that the motor is cooled by flowing a lubricating oil in the gap portion.

SUMMARY

There is a need for providing a motor case capable of promoting heat transfer from the motor to the motor case.

According to an embodiment, a motor case includes: a case inner wall, and an oil passage provided on the case inner wall to flow a lubricating oil therein. Further, the case inner wall includes a plurality of wedge-shaped portions, arranged side by side in a circumferential direction of a stator, for supporting an outer periphery of the stator, and a corrugated portion disposed radially outward of the stator with respect to the plurality of wedge-shaped portions and disposed around the plurality of wedge-shaped portions, and the oil passage is provided between the plurality of wedge-shaped portions and the corrugated portion, so that a lubricating oil is meandering so as to flow in the radial direction and in the circumferential direction of the stator.

DETAILED DESCRIPTION

In the configuration disclosed in Japanese Laid-open Patent Publication No. 2012-122451, since the gap portion serving as an oil passage is thin and narrow, the flow rate of the lubricating oil is limited. Further, in the configuration disclosed in Japanese Laid-open Patent Publication No. 2012-122451, the flow path of the lubricating oil in the oil passage, due to the laminar flow with less turbulence, the heat transfer from the motor to the motor case becomes limited. Therefore, there is room for improvement.

The motor case according to the embodiment of the present disclosure will be described with reference to the drawings. In addition, components in the following embodiments include those which can be substituted and easily by those skilled in the art, or those which are substantially the same.

The motor case according to the embodiment is for accommodating a motor consisting of a stator and a rotor. The motor case according to the embodiment is formed by, for example, aluminum die-casting. Further, the motor case according to the embodiment, as described below, incorporates a lubricating oil in direct contact with the motor (stator).

Figure 1:
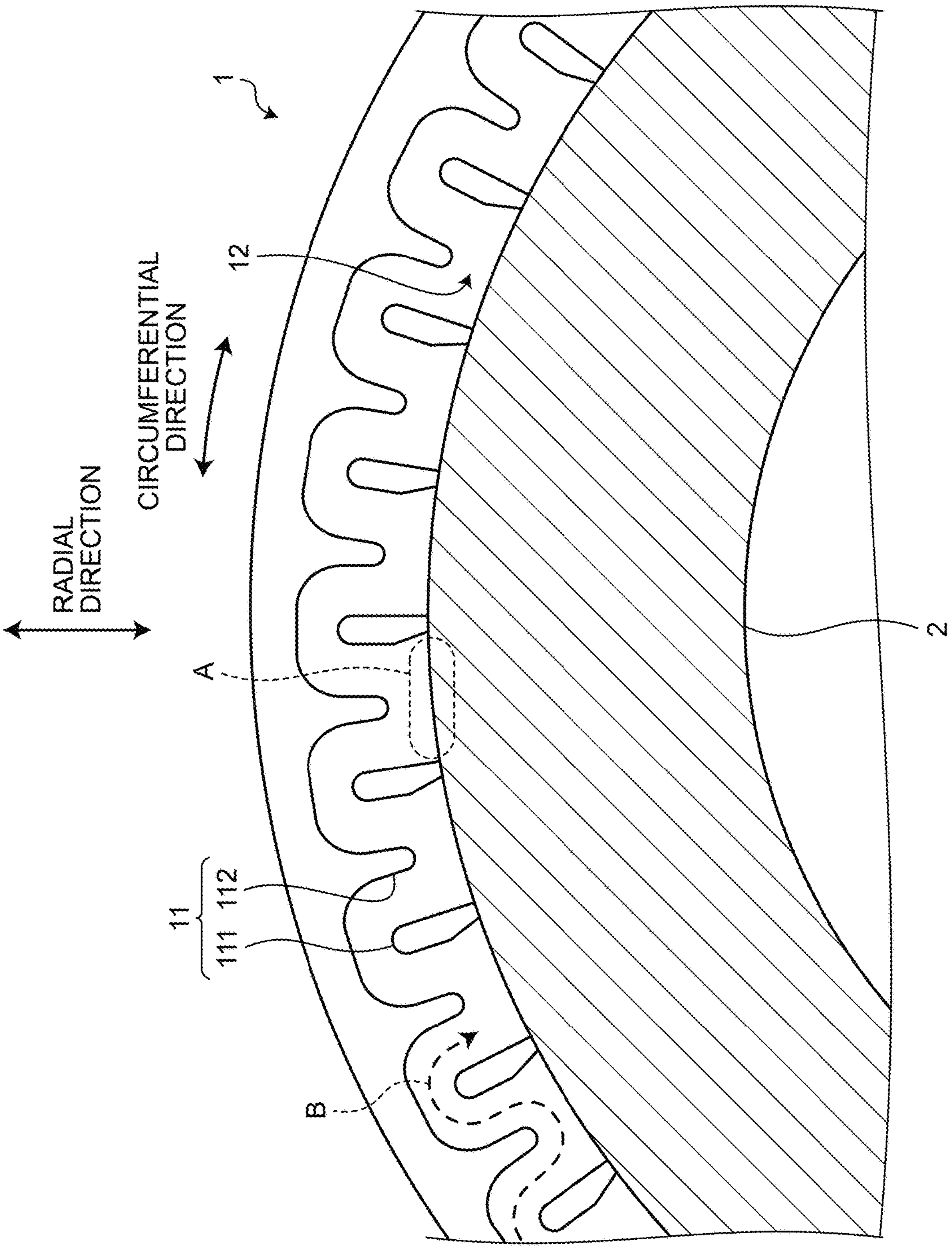
FIG. 1 is a sectional view illustrating a configuration of a motor case according to an embodiment.

The motor case 1, as illustrated in FIG. 1, includes a case inner wall 11 and an oil passage 12. Note that in the figure, for convenience of explanation, only a part of the cylindrical motor case 1 and the cylindrical stator 2 of the cross-section cut at a predetermined position in the axial direction is illustrated.

The case inner wall 11 includes a plurality of wedge-shaped portions 111, and a corrugated portion 112. A plurality of wedge-shaped portions 111 and the corrugated portion 112 are integrally configured. That is, a plurality of wedge-shaped portions 111 and the corrugated portion 112, as illustrated in FIG. 1, are provided spaced apart at a predetermined position in the axial direction of the stator 2 but are connected, for example, at both ends (or one end) of the axial direction of the stator 2 (or one end). However, a plurality of wedge-shaped portions 111 and the corrugated portion 112 may be configured separately.

The plurality of wedge-shaped portions 111 are disposed on the outer periphery of the cylindrical stator 2. That is, the plurality of wedge-shaped portions 111 are arranged side by side in the circumferential direction of the stator 2. Further, the plurality of wedge-shaped portions 111, in the circumferential direction of the stator 2, are arranged at predetermined intervals. Further, the tip of the plurality of wedge-shaped portions 111 is in contact with the outer periphery of the stator 2, and supports the outer periphery of the stator 2. Although not illustrated in FIG. 1, the stator 2 is also fixed by a fastening member (e.g., bolts, etc.) (not shown).

The corrugated portion 112, with respect to a plurality of wedge-shaped portions 111, is disposed radially outward of the stator 2. Further, the corrugated portion 112 is disposed around the stator 2 and a plurality of wedge-shaped portions 111.

The oil passage 12 is a flow passage for flowing lubricating oil. The oil passage 12 is provided in the circumferential direction of the stator 2 as a whole. That is, the lubricating oil in the oil passage 12 flows in the circumferential direction of the stator 2 as a whole.

Further, the oil passage 12 is provided between the plurality of wedge-shaped portions 111 and the corrugated portion 112. That is, the oil passage 12 is defined by the surface of the plurality of wedge-shaped portions 111, the outer peripheral surface of the stator 2 between the wedge-shaped portions 111 (see section A in FIG. 1), and the surface of the corrugated portion 112.

Further, the oil passage 12 is meandered so that the lubricating oil flows not only in the radial direction but also in the circumferential direction of the stator 2, as illustrated by the B portion in FIG. 1. That is, the oil passage 12, when cut at a predetermined position in the axial direction of the stator 2 as illustrated in the figure, the space extending in the radial direction (radially outer and radially inner) and a space extending in the circumferential direction are connected alternately. In other words, the oil passage 12 is formed in a labyrinth type (wave type) or a zigzag shape. Thus, the lubricating oil in the oil passage 12 flows alternately in the radial direction and in the circumferential direction, as illustrated in B portion of the figure.

Here, in a general motor case, for example, the outer periphery of the stator is supported by a cylindrical case inner wall, and the outer periphery of the case inner wall and the stator are in close contact. On the other hand, in the motor case according to the embodiment, the stator 2 is supported at the tip of the plurality of wedge-shaped portions 111, as illustrated in the A portion of FIG. 1, the lubricating oil between the wedge-shaped portions 111 is in direct contact with the stator 2, so that the area where the stator 2 is in direct contact with the lubricating oil area (wetted area) is increased. Thus, heat transfer from the stator 2 to the motor case 1 is promoted.

Further, in the motor case according to the embodiment, the stator 2 is supported by the tip of the plurality of wedge-shaped portions 111. Therefore, separately stator holder or the like is not always necessary.

Further, in the oil path of the general motor case in the related art, for example, since the oil path such lubricating oil flows only in the circumferential direction, the heat transfer from the stator to the motor case is limited. On the other hand, in the motor case according to the embodiment, in the oil passage 12, the lubricating oil flows alternately in the radial direction and in the circumferential direction, collides with the side surface of the wedge-shaped portions 111, the outer periphery of the stator 2, and the surface of the corrugated portion 112. Thus, heat transfer from the stator 2 to the motor case 1 is promoted.

Further, in the motor case according to the embodiment, due to the large surface area of the corrugated portion 112, the heat transfer between the lubricating oil and the case inner wall 11 is promoted. Therefore, the heat transfer from the stator 2 to the case inner wall 11 and air cooling via the motor case 1 are also promoted.

Modified Example

Figure 2:
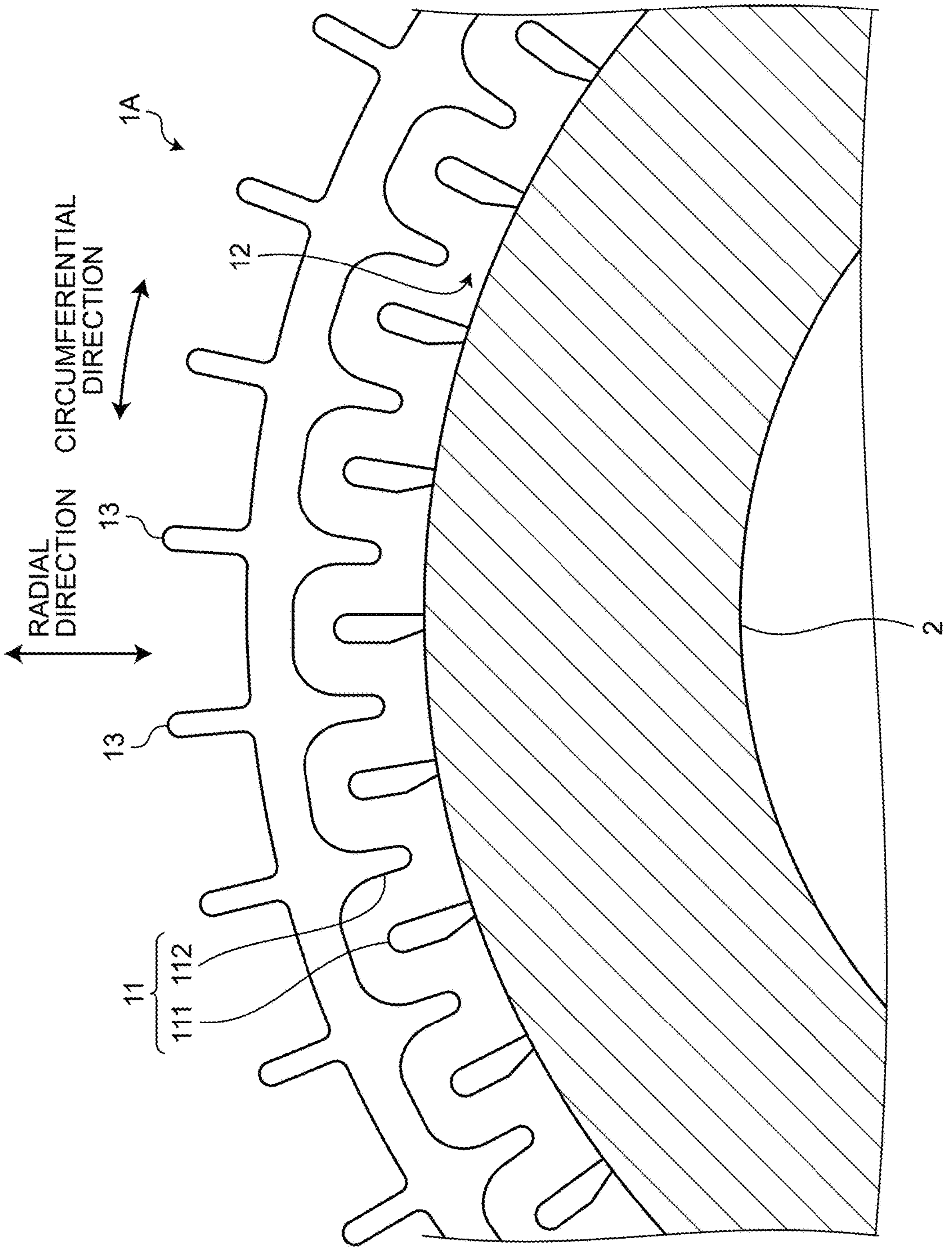
FIG. 2 is a sectional view illustrating a configuration of a modification of the motor case according to an embodiment.

A modification of the motor case according to an embodiment of the present disclosure will be described with reference to FIG. 2. The motor case 1A according to this modification includes a case inner wall 11, an oil passage 12, and a plurality of air-cooling fins 13. The configuration of the case inner wall 11 and the oil passage 12 is the same as that of the motor case 1 described above (see FIG. 1), and thus, the description thereof is omitted.

A plurality of air-cooling fins 13 are provided on the outer periphery of the motor case 1A. That is, the plurality of air cooling fins 13 are provided side by side in the circumferential direction of the stator 2. Further, the plurality of air cooling fins 13, are provided at predetermined intervals in the circumferential direction of the stator 2.

Thus, in the motor case 1A, by providing the plurality of air cooling fins 13, air cooling through the motor case 1A is more promoted.

According to the motor case according to the embodiment described above, since the oil passage 12 is meandering, the flow of lubricating oil is disturbed and agitated in the oil passage 12. Therefore, it is possible to promote the heat transfer from the motor (stator 2) to the motor case 1.

Further, in the motor case according to the embodiment, the oil passage 12 made of a wide gap is provided between the wedge-shaped portions 111 and the corrugated portion 112 to flow the lubricating oil at a large flow rate and high speed. Thus, the outer periphery of the stator 2 which forms a part of the oil passage 12 (see A portion in FIG. 1), strongly high-speed flow turbulence collides directly, the heat transfer from the stator 2 to the motor case 1 is promoted.

Further, in the motor case according to the embodiment, the lubricating oil which becomes a high temperature by receiving the heat in the motor (stator 2) is sent to the outside of the motor case 1, for example, cooling with an external oil cooler (water cooling or air cooling). Thus, since the water jacket around the motor case 1 is not required, the structure is simplified, it is possible to reduce the size and cost.

According to the present disclosure, since the oil passage is meandered, the flow of the lubricating oil is disturbed and agitated in the oil passage, thereby promoting heat transfer from the motor to the motor case.

Further effects and variations can be readily derived by one skilled in the art. Thus, the broader aspects of the present disclosure are not limited to the specific details and representative embodiments represented and described above. Accordingly, various changes may be made without departing from the spirit or scope of the overall disclosure concept defined by the appended claims and their equivalents.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor case comprising:
a case inner wall; and
an oil passage provided on the case inner wall to flow a lubricating oil therein;
wherein the case inner wall includes:
a plurality of wedge-shaped portions, arranged side by side in a circumferential direction of a stator, for supporting an outer periphery of the stator, each of the plurality of wedge-shaped portions including a tip that narrows in a radially inward direction; and
a corrugated portion disposed radially outward of the stator with respect to the plurality of wedge-shaped portions and disposed around the plurality of wedge-shaped portions, and
wherein the oil passage is provided between the plurality of wedge-shaped portions and the corrugated portion, so that a lubricating oil is meandering so as to flow in a radial direction and in the circumferential direction of the stator.

2. The motor case according to claim 1, wherein the plurality of wedge-shaped portions and the corrugated portion are integrally configured.

3. The motor case according to claim 1, further comprising a plurality of air cooling fins extending radially outward away from the case inner wall.

4. The motor case according to claim 3, wherein the corrugated portion includes a plurality of protrusions that extend radially inward and are circumferentially aligned with the plurality of air cooling fins.

5. The motor case according to claim 1, wherein openings are defined between adjacent wedge-shaped portions of the plurality of wedge-shaped portions such that the lubricating oil flowing through the oil passage can come into direct contact with the stator.

6. A motor case comprising:
a case inner wall; and
an oil passage provided on the case inner wall to flow a lubricating oil therein, wherein the case inner wall includes:
a plurality of wedge-shaped portions for supporting an outer periphery of a stator are arranged side by side in a circumferential direction of the stator; and
a corrugated portion disposed radially outward of the stator with respect to the plurality of wedge-shaped portions and disposed around the plurality of wedge-shaped portions,
wherein the oil passage is provided between the plurality of wedge-shaped portions and the corrugated portion, so that a lubricating oil is meandering so as to flow in a radial direction and in the circumferential direction of the stator, and wherein openings are defined between adjacent wedge-shaped portions of the plurality of wedge-shaped portions such that the lubricating oil flowing through the oil passage can come into direct contact with the stator.

7. The motor case according to claim 6, wherein the plurality of wedge-shaped portions and the corrugated portion are integrally configured.

8. The motor case according to claim 6, further comprising a plurality of air cooling fins extending radially outward away from the case inner wall.

9. The motor case according to claim 8, wherein the corrugated portion includes a plurality of protrusions that extend radially inward and are circumferentially aligned with the plurality of air cooling fins.

* * * * *